United States Patent [19]

Martin

[11] Patent Number: 5,158,040

[45] Date of Patent: * Oct. 27, 1992

[54] ANIMAL FEEDER

[75] Inventor: Paul Martin, Drayton, Canada

[73] Assignee: H. Kuntz Manufacturing Inc., St. Jacobs, Canada

[*] Notice: The portion of the term of this patent subsequent to Oct. 27, 2006 has been disclaimed.

[21] Appl. No.: 201,281

[22] Filed: May 27, 1988

Related U.S. Application Data

[63] Continuation of Ser. No. 927,447, Nov. 6, 1986, abandoned.

[51] Int. Cl.⁵ .............................................. A01K 5/00
[52] U.S. Cl. ...................................... 119/58; 119/60
[58] Field of Search ................................ 119/58, 59, 60

[56] References Cited

U.S. PATENT DOCUMENTS

| | | | |
|---|---|---|---|
| 375,824 | 1/1888 | Light | 119/60 |
| 3,004,518 | 10/1961 | Struckhoff | 119/58 |
| 3,906,901 | 9/1975 | Cox | 119/58 |
| 4,020,794 | 5/1977 | Nethery | 119/60 |
| 4,148,278 | 4/1979 | Anderson | 119/60 |
| 4,258,663 | 3/1981 | Schoessow | 119/60 |
| 4,285,300 | 8/1981 | Spane | 119/60 |
| 4,419,963 | 12/1983 | Willibrordus | 119/58 |
| 4,706,609 | 11/1987 | Delichte | 119/58 |

FOREIGN PATENT DOCUMENTS 2450556  11/1980  France ................................. 119/58

Primary Examiner—Gene Mancene
Assistant Examiner—Michael Lynch
Attorney, Agent, or Firm—Anthony Asquith & Co.

[57] ABSTRACT

The device disclosed includes an outer cage of bars through which cows may pass their heads and necks, but not their shoulders. The device includes an inner cage, which holds a cylindrical hay-bale. The arrangement is such that the cows must reach through the bars of the outer cage in order to reach the hay in the inner cage. The device includes a trough which extends between the two cages, so that any hay that falls from the cow's mouth while the cow has its head between the bars is caught in the trough. The feeder practically eliminates hay wastage.

6 Claims, 2 Drawing Sheets

ANIMAL FEEDER

This invention is a continuation of 06/927,447 filed on Nov. 6, 1986, now abandoned and relates to outdoor animal feeders, of the kind that are used to present fodder, such as hay, to cattle.

BACKGROUND OF THE INVENTION

Conventional cattle feeders consist generally of a head-level rack for storing the hay, either loose or baled, and a trough in the area below the rack. The purpose of the trough is to catch any hay that falls from the rack. The cattle eat both from the rack and from the trough.

Conventional cattle feeders have been generally rather wasteful of hay. In conventional outdoor feeders, as much as 30 percent of the hay can be lost, through being scattered around, and either blown away, or trampled.

Cattle do not eat neatly. The main manner in which the waste occurs is this, that the cow tears at a bale of hay, by gripping a tuft of hay in the mouth. The cow draws the tuft of hay out of the bale, and aside, before starting to eat the mouthful of hay. Inevitably, a proportion of the hay in the tuft falls from the cow's mouth during this phase. That this fallen hay is wasted has hitherto been accepted as an unfortunate but necessary factor in the feeding of cattle, being an inevitable consequence of the manner in which cows eat.

It is recognised in the invention that a feeder can be so constructed that, if and when the cow drops a portion of a mouthful of hay, the feeder will make it possible for the dropped or spilled hay to be collected, and to be re-presented to the cattle. A feeder constructed according to the invention is therefore aimed at having a much reduced wastage rate, as compared with conventional feeders.

GENERAL DESCRIPTION OF THE INVENTION

In the invention, the hay is contained in an inner frame or cage. The inner cage is surrounded by an outer cage. The outer cage is made from bars which are wide enough apart that a cow can pass its head and neck through the bars, yet which are close enough together that the shoulders of the cow cannot pass between the bars.

The outer cage is spaced horizontally from the inner cage, so that the cow has to reach through the bars of the outer cage in order to reach the hay in the inner cage. A trough is so placed, in relation to the two cages, as to catch any hay falling from the cow's mouth while the cow's head is between the bars.

In order for the cow to drop any hay outside the feeder, therefore, the cow would have to carry the hay a substantial distance, and then draw the hay backwards through the bars. It has been found that when cattle use the feeder of the invention, the cattle do not tend to have hay in their mouths when they pull their heads out from between the bars of the outer cage; not, at least, to the extent that hay is spilled from the mouths of the cows in any significant quantity.

In the invention, the reduced waste therefore can be attributed: (a) to the spacing between the inner cage and the outer cage; (b) to the positioning of the trough that catches the spilled hay that falls between the two cages; and (c) to the fact that the cow does tend to eat more neatly while its head and neck are between the bars.

It may be observed that cows, when feeding from the feeder of the invention, spend most of the feeding time eating the hay in the trough part of the feeder, reaching up occasionally to pull down more hay from the inner cage, rather than eating the hay directly from the bale. It is recognised in the invention that it is when a cow is pulling hay from the bale, rather than when the cow is eating from the trough, that wastage tends to occur—and the fact that, in the invention, the cows tend to eat mainly from the trough, and not from the bale, is another contributory factor in achieving the waste reduction that is possible with the invention.

Another benefit of the fact that the head of the cow is restricted and confined during feeding is that the more dominant or aggressive cows are prevented from interfering with the feeding of the weaker cows.

Naturally, the two cages should not be so far apart that the cow cannot reach the hay in the inner cage. The cattle should be able to reach far enough into the feeder that even the final stands of hay from a bale can be taken into the mouth and eaten.

A key feature of the invention is the recognition that wastage can be reduced basically by not presenting the fodder directly to the cow but by making sure that the cow has to pass its head and part of its neck between bars before it can reach the fodder.

The feeder of the invention is particularly suitable for use with cylindrical hay-bales. As will be seen from the description which follows, a whole herd of cows can feed from a single cylindrical bale simultaneously, yet each cow receives adequate access to the hay.

The feeder to the invention is extremely simple as regards its construction, and the feeder is tough and sturdy; it can be tipped on its side, for example, for transport purposes, and can be stacked and generally manhandled without being damaged.

DETAILED DESCRIPTION OF PREFERRED EMBODIMENT

Figure 1:
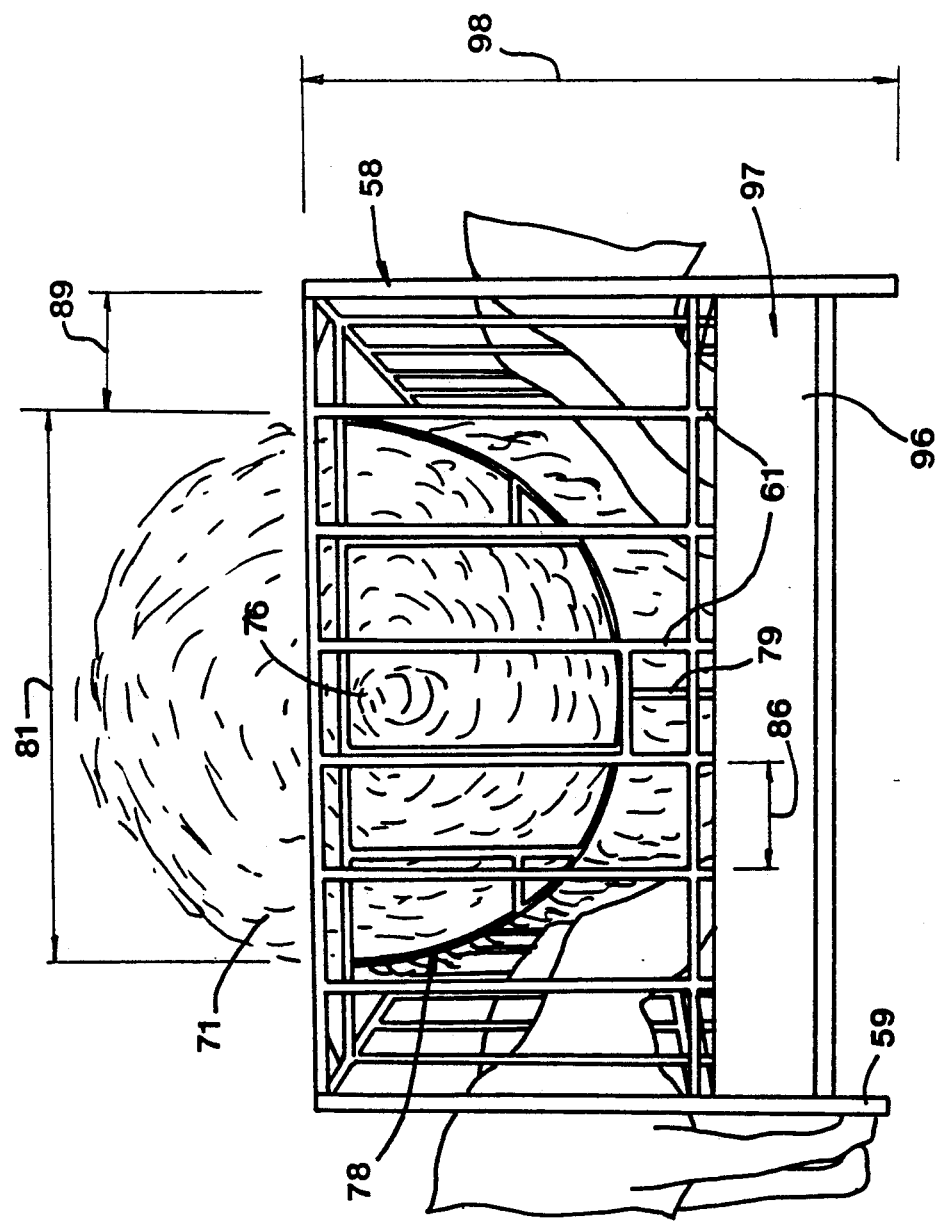
Figure 2:
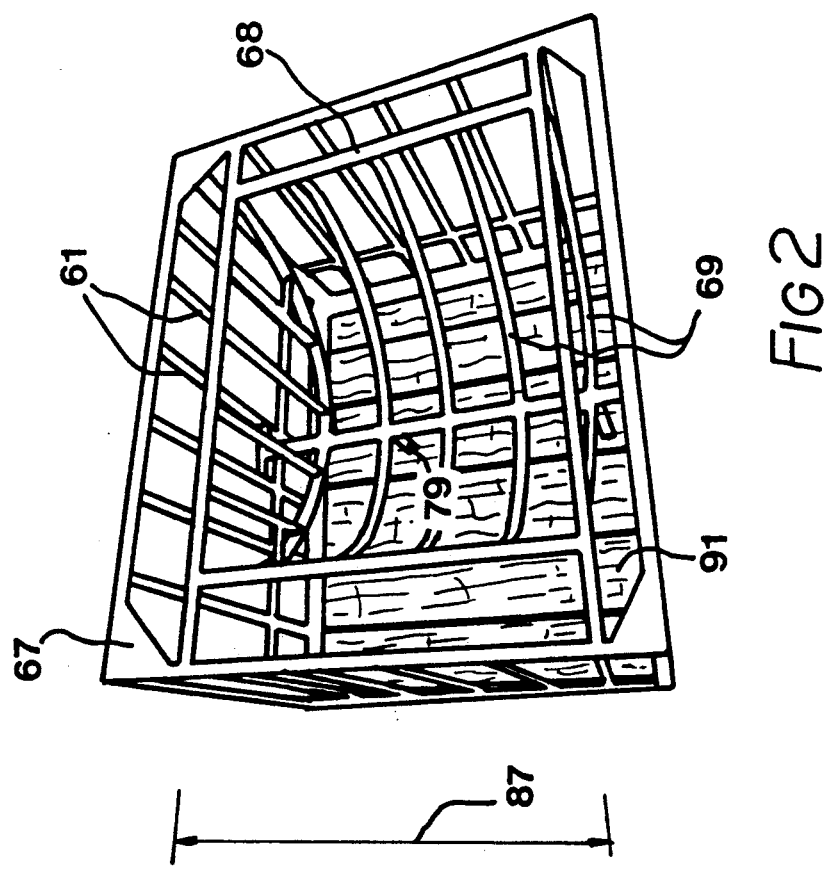

The invention will now be further described by making reference to an exemplary embodiment of the invention, which is shown in the accompanying drawings. In the drawings, FIG. 1 is a perspective elevation of an animal feeder which embodies the invention, shown in use with cattle feeding from a hay-bale;

FIG. 2 is a perspective view, partly from above of the feeder of FIG. 1.

The cattle feeder unit shown comprises an outer-cage 58, which rests on legs 59 on the ground. (The feeder might alternatively be mounted on wheels, for mobility.)

The outer-cage 58 comprises a series of vertically disposed outer-cage-bars 61, which are spaced apart by such a distance that a typical farm cow can pass its head and neck through and between the bars, but cannot pass its shoulders between the bars.

The outer-cage 58 constitutes an enclosure which is rectangular when viewed in plan, i.e. from above. The cage 58 is self-supporting, being braced by corner pieces 67.

The outer-cage 58 is provided with rafters 68. Suspended from the rafters 68 are a set of semicircular slats 69. These slats 69 are arranged to support a cylindrical hay-bale 71 with the axis of the hay-bale disposed horizontally. The slats 69 from an inner-cage 78, which is open above, to allow the hay-bale 71 to be loaded into the inner-cage 78, using a front-end-loader or other suitable hoisting apparatus.

The slats 69 are also supported underneath by means of the struts 79. The inner-cage 78 serves to support the hay-bale 71, and to keep the hay-bale coherent, while the hay-bale gets smaller (as the cows eat the hay). Hay-bales are generally tied up with twine, or even wire, which should be removed before the cattle start to eat the hay.

As to the dimensions of the particular unit shown, the diameter 81 of the semicircular of the slats 69 is approximately 175 cm, which is a suitable size for accommodating the typical farm hay-bale 71.

The inner-cage 78 has an axial length 87 of 150 cm, which, again, accomodates the typical hay-bale 71. The outer-cage 58 is 215 cm in axial length, and 245 cm wide. The height of the outer-cage 58 is 175 cm. The outer-cage-bars 61 are spaced a distance 86 apart, which is about 30 cm.

The inner-cage 78 corresponds in diameter to that of a cylindrical hay-bale. As the hay is consumed, the size of the bale of course is reduced: however, the fact that the slats of the inner-cage are semi-circular in shape serves to keep the gradually-reducing bale presented to the cows in a virtually unchanging fashion, until the bale has been almost fully consumed. The slats 69 serve to keep the bale not only coherent, but serve also to keep its lower face cylindrical, as the bale is consumed, and as the bale collapses down into the inner-cage. The manner in which the cattle can draw hay from the bale therefore tends to remain constant until the bale is almost consumed.

In some other kinds of feeder, the manner in which the hay is presented to the cattle gradually changes as the bale shrinks, whereas in the illustrated feeder the hay is presented in the favourable manner of the invention almost the whole time.

In the illustrated feeder, also, when a fresh bale is loaded into the feeder, the remaining hay from the almost-consumed earlier bale is presented first to the cows, and is not covered and obscured by the addition of the fresh bale.

The distance 89 from the slats 69 of the inner-cage 78 to the bars 61 of the outer-cage 58 should be set so that a cow can reach hay in the inner-cage 78 by passing its head and neck through the outer-cage-bars 61, and the cow can thus take hay from within the inner-cage 78 into its mouth. The dimension 89 is the distance measured at the top of the cage. In the invention, this distance can be set so as to combine efficient feeding with very low wastage. The distance 89 varies with the type of cattle, in that some breeds of cattle having considerably longer necks (i.e. the distance from the furthest reach of the mouth and tongue, to the shoulder) than other breeds. For example, for dairy Holsteins, the distance 89 should be around 35 cm, whereas for Herefords, and other beef cattle, the distance 89 should be around 25 cm.

The bottom of the outer-cage 58 is provided with floor-boards 91, which extend over the full area of the outer-cage 58. The outer-cage-bars 61 are filled-in at the lower ends by means of side-walls 96. The floor-boards 91 and side-walls 96 form a trough 97.

The trough 97 receives any hay that is torn from the hay-bale 71 within the inner-cage 78 by the cows, and dropped or spilled. The side-walls 96 prevent the loose strands of hay from being carried off by the wind.

It is preferred, in the invention, that the outer-cage-bars 61 be disposed vertically. If the bars were to slope inwards, i.e. if the bottoms of the bars were to be further from the cows than the tops of the bars, then the cow's mouth would be clear of the trough before the cow had withdrawn its head from between the bars. The tendency would then be for some of the hay to be scattered outside the trough, and lost. If the bars were to slope outwards, the cows would tend to strike their fore-feet on the bottom ends of the bars. When the bars are vertical, both these effects are minimised. Also, when the bars are vertical, construction of the feeder is thereby simplified.

The slats 69 support the hay-bale 71 a distance 98 (which typically is 80 cm) above the ground. It has been found that with the bale 71 and trough 97 thus disposed, many cattle can be fed quickly and efficiently, and without one cow interfering with another. In the particular unit shown, it will be noted that there are altogether 26 spaces that can be occupied by cows (i.e. 26 spaces between the bars 61) including the spaces down both sides of the curved cylindrical surfaces of the bale, and also the spaces along both end-faces of the bale. It has been found to be not at all unusual for all 26 spaces to be occupied simultaneously, each by a respective cow.

The hay in the trough 97 is hay that has been torn down from the bale; and the action of just one cow in tearing down hay therefore acts to keep the trough supplied with fodder for the other cows.

Other kinds of fodder may be added into the trough 97 to supplement the hay.

Although dimensions have been quoted in the above description, it should be noted that the invention is not limited to the particular dimensions given. The dimensions given are merely examples which have been found to be effective.

I claim:

1. Animal feeder, characterised:
   in that the feeder includes an inner-cage, an outer-cage, and a trough;
   in that the inner-cage is suitably dimensioned and arranged for receiving a hay-bale of hay, and for containing the hay-bale as hay is taken from the hay-bale for consumption by an animal using the feeder;
   in that the inner-cage is so arranged that the animal can reach and tear hay from the hay-bale and can draw the said hay torn from the hay-bale from within the inner-cage;
   in that the outer-cage-bars are so spaced and arranged that the animal can pass its head and neck through the outer-cage-bars, but cannot, in substance, pass its shoulders through the outer-cage-bars;
   in that the outer-cage surrounds the inner-cage;
   in that the dimensional and positional relationship between the inner-cage and the outer-cage is such that the closest point on the inner-cage-bars that can be reached by the mouth of an animal standing outside the outer-cage is spaced so far from the outer-cage that the said animal cannot reach the said point on the inner-cage-bars unless and until both its head and a portion of its neck have passed through and between the outer-cage-bars;
   in that the horizontal spacing between the inner-cage and the outer-cage is such that, when the animal draws hay into its mouth from within the inner-cage, the animal is constrained to carry the said hay a substantial distance before the animal can with-draw its head and mouth completely from between the outer-cage-bars;

in that the trough is so positioned as to catch and contain spilled hay that falls downwards from the animal's mouth as the animal carries the said hay it has drawn from the inner-cage;

(and) in that the trough extends so far, in the direction from the inner-cage towards the said animal using the feeder, as to catch hay that falls downwards from the animal's mouth at the point where the animal's mouth is about to pass out completely from between the outer-cage-bars;

in that the trough has a floor area which occupies the whole area, in plan, of the outer-cage;

in that the inner cage is raised well-clear above the level of the floor area of the trough;

in that the height of the inner cage above the floor area of the trough is such that, in order for an animal to reach the last of a body of hay contained within the inner cage, the animal must, in substance, reach upwards;

and in that the whole floor area of the trough, including that portion of the floor area of the trough that lies underneath the inner cage, is clear and unimpeded, and the said whole area is clearly accessible to the mouth of an animal standing outside the outer cage.

2. Feeder of claim 1, further characterised:

in that the inner-cage is so dimensioned and arranged as to receive and contain a hay-bale of cylindrical shape;

and in that the inner-cage is so arranged that the surfaces of the hay-bale that are presented to the feeding animals through the inner-cage are a portion of the cylindrical curved surface of the hay-bale and portions of both of the end-faces of the cylindrical hay-bale.

3. Feeder of claim 1, further characterised in that the outer-cage-bars are disposed vertically.

4. Feeder of claim 1, further characterised in that the trough includes side-walls; and in that the side-walls are disposed in line with, and between, the outer-cage-bars.

5. Feeder of claim 1, further characterised in that the inner-cage comprises a series of slats of semicircular shape, and in that the slats are so arranged as to support the hay-bale well-clear above the level of the trough.

6. Feeder of claim 5, further characterised:

in that the outer cage is rectangular, and is approximately 245 cm wide, and 215 cm long;

in that the semi-circular slats which comprise the inner cage are approximately 150 cm in diameter;

in that the inner cage is approximately 150 cm in length; and in that the inner cage is so arranged that the lowermost portion of a hay bale resting in the inner cage is approximately 80 cm above ground level.

* * * * *